United States Patent
Wang et al.

(10) Patent No.: US 8,345,924 B2
(45) Date of Patent: Jan. 1, 2013

(54) ELECTRONIC DEVICE AND METHOD FOR MONITORING WATER LEVEL

(75) Inventors: Chi-Chih Wang, Taipei Hsien (TW); Quan-Zhong Zhang, Shenzhen (CN); Fei Huo, Shenzhen (CN); Hao Tan, Shenzhen (CN)

(73) Assignees: GDS Software (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 386 days.

(21) Appl. No.: 12/848,211

(22) Filed: Aug. 1, 2010

(65) Prior Publication Data

US 2011/0156917 A1    Jun. 30, 2011

(30) Foreign Application Priority Data

Dec. 30, 2009 (CN) .......................... 2009 1 0312722

(51) Int. Cl.
*G06K 9/00* (2006.01)
*G01F 25/00* (2006.01)
*G01F 23/00* (2006.01)
*G01D 1/00* (2006.01)
*G08C 15/06* (2006.01)
*G08B 23/00* (2006.01)
*G08B 5/22* (2006.01)

(52) U.S. Cl. ........ 382/103; 73/1.73; 73/290 R; 702/127; 340/870.02; 340/500; 340/6.1

(58) Field of Classification Search ........................ None
See application file for complete search history.

(56) References Cited

U.S. PATENT DOCUMENTS

| | | | | |
|---|---|---|---|---|
| 6,098,029 | A * | 8/2000 | Takagi et al. ................. | 382/100 |
| 2005/0271266 | A1* | 12/2005 | Perrier .......................... | 382/157 |
| 2006/0178578 | A1* | 8/2006 | Tribble et al. ................ | 600/432 |
| 2010/0322462 | A1* | 12/2010 | Wu et al. ...................... | 382/100 |

* cited by examiner

*Primary Examiner* — Jennifer Mehmood
*Assistant Examiner* — Pameshanand Mahase
(74) *Attorney, Agent, or Firm* — Altis Law Group, Inc.

(57) ABSTRACT

An electronic device with a water level monitoring system monitors a buoy to determine if a water level is acceptable. The device separates level markers of the containment facility and the buoy floating therein. The device traces a trace of the movement of the buoy and compares the trace and security lines to determine if the water level is acceptable or not. If the water level is unacceptable, the device sends an alarm to an alarm mainframe to display a warning on a monitor array.

15 Claims, 4 Drawing Sheets

ELECTRONIC DEVICE AND METHOD FOR MONITORING WATER LEVEL

BACKGROUND

1. Technical Field

Embodiments of the present disclosure relate to surveillance, and more particularly to an electronic device and method for monitoring water level.

2. Description of Related Art

Monitoring water level is crucial to maintaining safety and operation of a variety of structures and facilities. Currently, much water level monitoring uses pressure sensors installed around a water containment system. However, the cost of the requisite hardware implemented water level monitor system is very high and the maintenance is hazardous.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be integrated in firmware, such as an EPROM. It will be appreciated that module may comprise connected logic units, such as gates and flip-flops, and may comprise programmable units, such as programmable gate arrays or processors. The units described herein may be implemented as software and/or hardware unit and may be stored in any type of computer-readable medium or other computer storage device.

Figure 1:
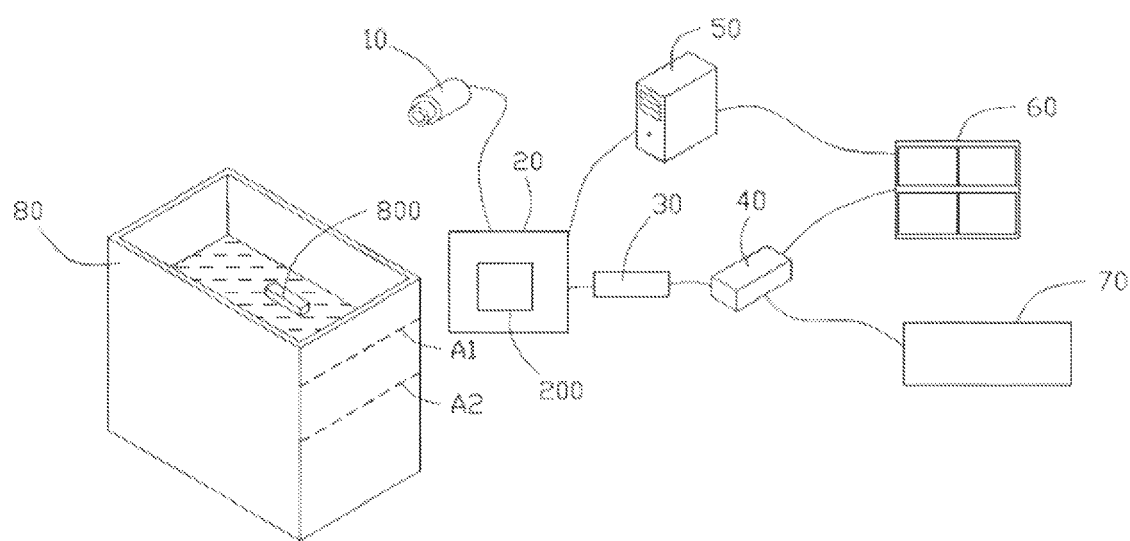
FIG. 1 is a schematic diagram of a water level monitoring system and environment thereof.

FIG. 1 is a schematic diagram of a water level monitoring system comprising a camera 10, a video encoder 20, a video decoder 30, a video distributor 40, an alarm mainframe 50, a monitor array 60, and a video recorder 70. The camera 10 electronically communicates with the video encoder 20. The video encoder 20 electronically communicates with the video decoder 30. The video decoder 30 electronically communicates with the video distributor 40. The video distributor 40 electronically communicates with the monitor array 60 and the video recorder 70 respectively. The alarm mainframe 50 electronically communicates with both the monitor array 60 and video encoder 20.

The camera 10 is operable to record a live video feed of a monitored location, which can be a watercourse, swimming pool, reservoir, sewage tank, or other large containment facility. In the embodiment, the location is a sewage pool 80. In the embodiment, the sewage pool 80 has two level markers, an upper level marker A1 and a lower level marker A2. A buoy 800 floats on the surface of the sewage pool 80. The water level is deemed acceptable when the buoy 800 is between A1 and A2. Otherwise, the water level is considered unacceptable.

In the embodiment, the camera 10 comprises a charge coupled device (CCD), resolution of which exceeds 480 Television Line (TVL) and signal to noise ratio (SNR) exceeds 50 dB. The camera 10 utilizes infrared lighting to provide uninterrupted function of camera 10, irrespective of ambient light. The camera 10 is operable to record analog video input.

Figure 2:
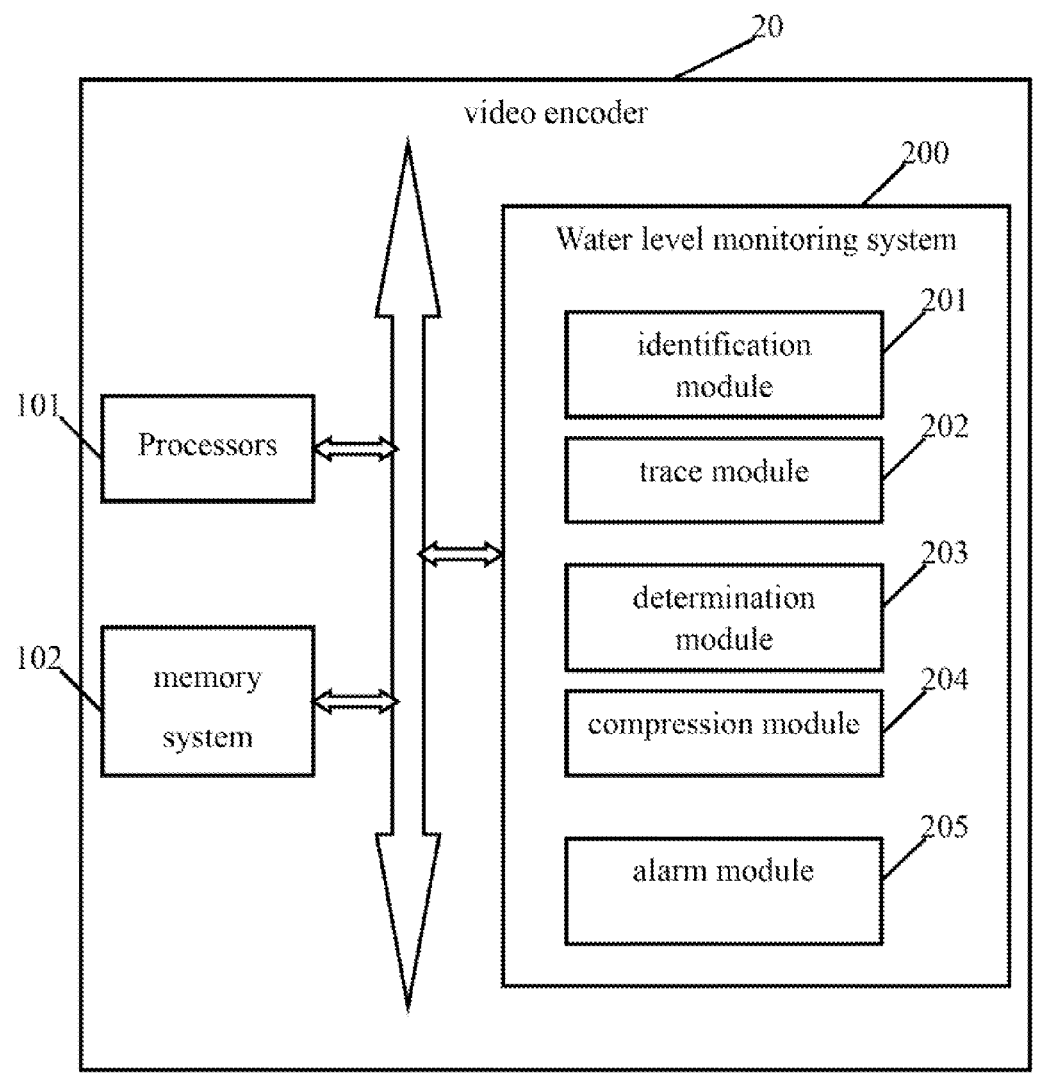
FIG. 2 is a block diagram of one embodiment of a water level monitoring system.
Figure 3:
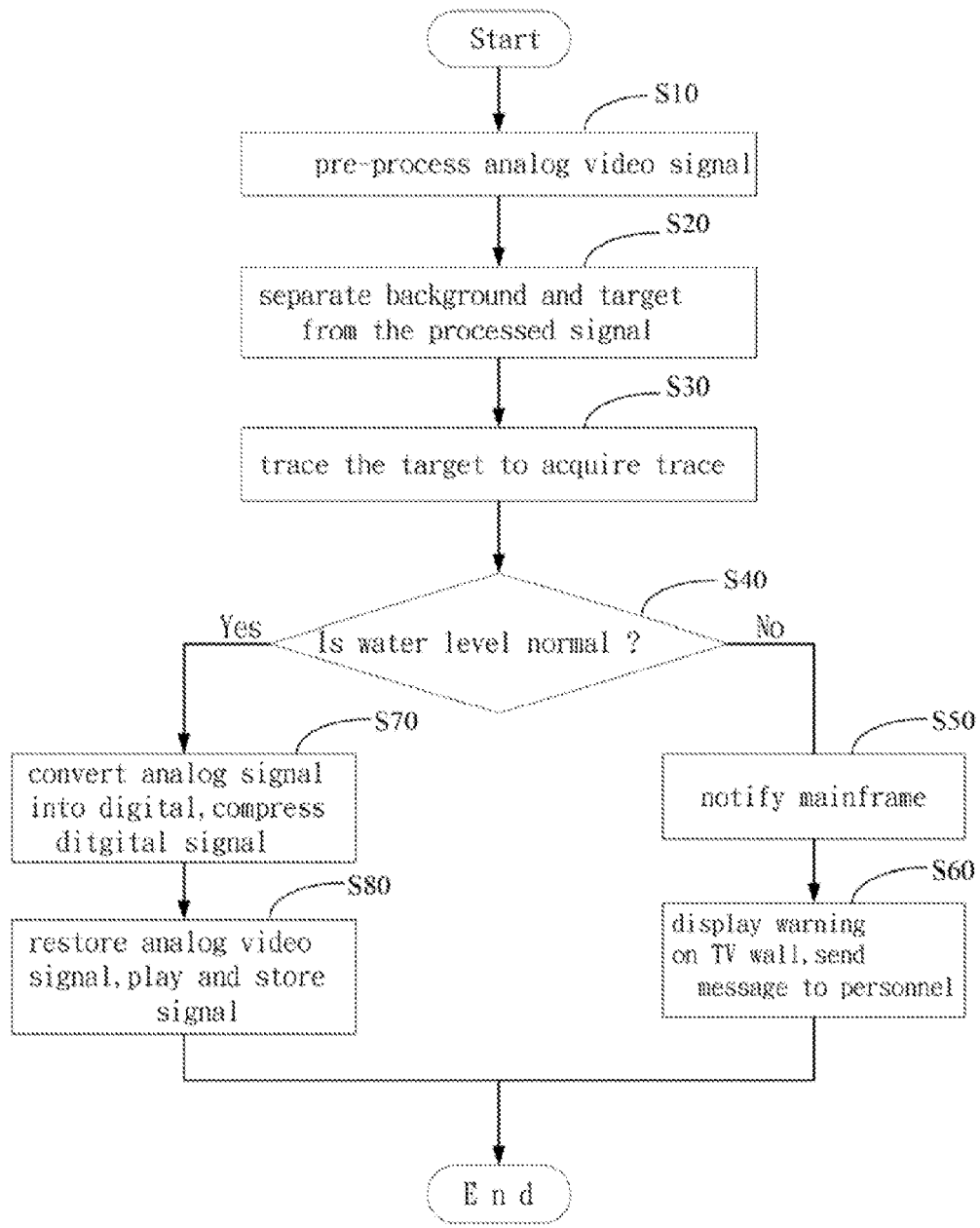
FIG. 3 is a flowchart illustrating one embodiment of a water level monitoring method.

The video encoder 10 is operable to receive the analog video signal from the camera 10 and analyze the analog video signal to determine if the water level is acceptable. The video encoder 10 is operable to send an alarm to the alarm mainframe 50 when the water level is deemed unacceptable. The video encoder 10 is operable to convert the analog video signal into a digital signal and compress the digital signal to a plurality of data packets for transmission, since analog signals attenuate significantly when transmitted over 200 meters. In addition, the video encoder 20 comprises a water level monitoring system 200 as shown in FIGS. 2 and 3.

The video decoder 30 is operable to decode the data packets received from the video encoder 30. The video decoder 30 is operable to restore the data packets to the analog video signal and send the restored analog video signal to the video distributor 40.

The video distributor 40 is operable to redistribute the restored analog video signal to the monitor array 60 for display and the video recorder 70 for storage.

The alarm mainframe 50 is operable to display a warning on the monitor array 60 upon receiving the alarm from the video encoder 20. The alarm mainframe 50 is operable to broadcast an audio alarm, and send a short message to related personnel. Depending on the embodiment, the alarm mainframe 50 can be a personal computer, a workstation, or a notebook, for example.

FIG. 2 is a block diagram of one embodiment of the water level monitoring system 200. The system 200 includes an identification module 201, a trace module 202, a determination module 203, a compression module 204, and an alarm module 205. One or more computerized codes of the modules 201-205 is stored in a memory system 102 and executed by one or more processors 101 of the video encoder 20.

In the embodiment, the identification module 201 is operable to pre-process the analog video signal to identify and separate a target from a background, where the background includes the level markers A1 and A2, and the target is the buoy 800. The pre-processing described herein includes shadow suppression and light inhibition to heighten the contrast of the analog video signal. The background described herein is unchanged objects in the scene, from which the buoy 800, in motion, is separated as the target.

In the embodiment, the trace module 202 is operable to trace the identified target. For example, the trace module 202 traces the buoy 800 in the sewage pool 80 to acquire the trace of the buoy 800.

Figure 4:
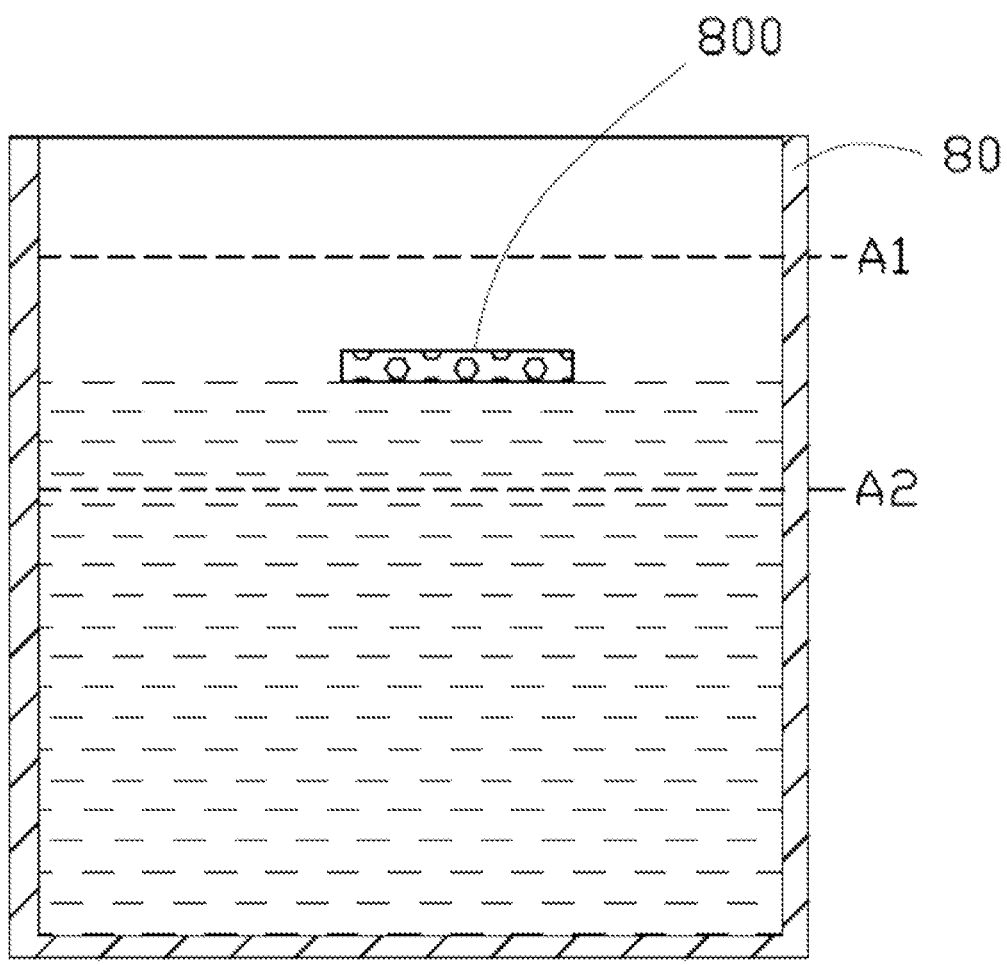
FIG. 4 is a schematic diagram of a buoy floating on a sewage pool.

In the embodiment, the determination module 203 is operable to determine if a water level is acceptable according to a comparison of the trace of the target and the level markers A1 and A2. In FIG. 4, the buoy 800 is traced in a position between the high level marker A1 and the low level marker A2. The determination module 203 determines thereby that the water level is acceptable. If the buoy 800 is traced in a position above the high level marker A1 or below the low level marker A2, the determination module 203 determines that the water level is unacceptable.

In the embodiment, the compression module 204 is operable to convert the analog video signal into the digital signal, compress the digital signal to data packets, and transmit the data packets to the video decoder 30 if the water level is acceptable. The alarm module 205 is operable to send the alarm to the alarm mainframe 50 when the water level is unacceptable.

FIG. 3 is a flowchart illustrating one embodiment of a method for monitoring water level of a water containment area. In block S10, the identification module 201 pre-processes the analog video signal recorded by the camera 10 to level the luminosity of the analog video signal in standard range. In block S20, the identification module 201 separates the background and the target from the processed video signal. In the embodiment, the target is the buoy 800. In block 30, the trace module 202 traces the target to acquire the trace of the target. In block 40, the determination module 203 determines the water level is acceptable. If the water level is acceptable block S70 is implemented. Otherwise, block S50 is implemented, in which the alarm module 205 sends the alarm to the alarm mainframe 50. In block S60, the alarm mainframe 50 displays the warning on the monitor array 60, broadcasts the audio alarm, and sends a short message to alert related personnel. In block S70, the compression module 204 converts the analog video signal into the digital signal, compresses the digital signal to data packets, and transmits the data packets to the video decoder 30. In block S80, the video decoder decodes the data packets to restore the analog video signal and sends the analog video signal to the monitor array 60 for display and to the video recorder 70 for storage, via the video distributor 40.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
    a memory system;
    one or more processors; and
    one or more programs stored in the memory system configured to be executed by the one or more processors, the one or more programs comprising:
        an identification module to pre-process an analog video signal of a water containment area from a camera device electronically connected with the electronic device to identify and separate a target from a background, wherein the background comprises at least one level marker of the water containment area;
        a trace module to trace the identified target to acquire a trace thereof;
        a determination module to determine if a water level of the water containment area is acceptable according to a comparison of the trace of the target and the at least one level marker; and
        an alarm module to issue an alarm to an alarm mainframe when the water level is unacceptable.

2. The device as claimed in claim 1, wherein the device further comprises a compression module to convert the analog video signal into a digital signal, compress the digital signal to a plurality of data packets, and transmit the data packets to a video decoder if the water level is acceptable.

3. The device as claimed in claim 2, wherein the video decoder decodes the data packets, restores the analog signal, and transmits the restored analog signal to a monitor array and a video recorder, wherein the monitor array displays the analog signal and the video recorder stores the analog signal.

4. The device as claimed in claim 1, wherein the pre-procession comprises shadow suppression and light inhibition.

5. The device as claimed in claim 1, wherein the alarm mainframe displays a warning on the monitor array, broadcasts an audio alarm, and sends a short message to alert relative personnel.

6. A computerized method of an electronic device, comprising:
    pre-processing an analog video signal of a water containment area from a camera device electronically connected with the electronic device;
    identifying a target and a background, wherein the background comprises at least one level marker of the water containment area;
    tracing the identified target to acquire a trace thereof;
    determining if a water level of the water containment area is acceptable according to a comparison of the trace of the target and the at least one level marker; and
    issuing an alarm if the water level is unacceptable.

7. The computerized method as claimed in claim 6, wherein the method further comprises, if the water level is acceptable:
    converting the analog video signal into a digital signal;
    compressing the digital signal to a plurality of data packets; and
    transmitting the data packets to a video decoder.

8. The computerized method as claimed in claim 7, wherein the video decoder decodes the data packets, restores the analog signal, and transmits the restored analog signal to a monitor array and a video recorder, wherein the monitor array displays the analog signal and the video recorder stores the analog signal.

9. The computerized method as claimed in claim 6, pre-processing further comprises shadow suppression and light inhibition.

10. The computerized method as claimed in claim 6, wherein issuing an alarm comprises:
    displaying a warning on the monitor array;
    broadcasting an audio alarm; and
    sending a short message to alert relative personnel.

11. A non-transitory computer readable storage medium having stored therein instructions, that when executed by one or more processors of an electronic device, cause the device to: pre-process an analog video signal of a water containment area from a camera device electronically connected with the electronic device; identify a target and a background, wherein the background comprises at least one level marker of the water containment area; trace the identified target to acquire a trace thereof;
    determine if a water level is acceptable according to a comparison of the trace of the target and the at least one level marker of a water containment area; and issue an alarm if the water level is unacceptable.

12. The non-transitory computer readable storage medium as claimed in claim 11, wherein if the water level is acceptable the instructions further cause the device to: convert the analog video signal into a digital signal; compress the digital signal to a plurality of data packets; and transmit the data packets to a video decoder.

13. The non-transitory computer readable storage medium as claimed in claim 12, wherein the video decoder decodes the data packets, restores the analog signal, and transmits the restored analog signal to a monitor array and a video recorder, wherein the monitor array displays the analog signal and the video recorder stores the analog signal.

14. The non-transitory computer readable storage medium as claimed in claim 11, wherein pre-processing further comprises shadow suppression and light inhibition.

15. The non-transitory computer readable storage medium as claimed in claim 11, wherein the step of issuing an alarm comprises: displaying a warning on the monitor array; broadcasting an audio alarm; and sending a short message to alert relative personnel.

* * * * *